May 20, 1924.
F. WESTERMAN
CONVEYER
Filed Feb. 12, 1923
1,494,655
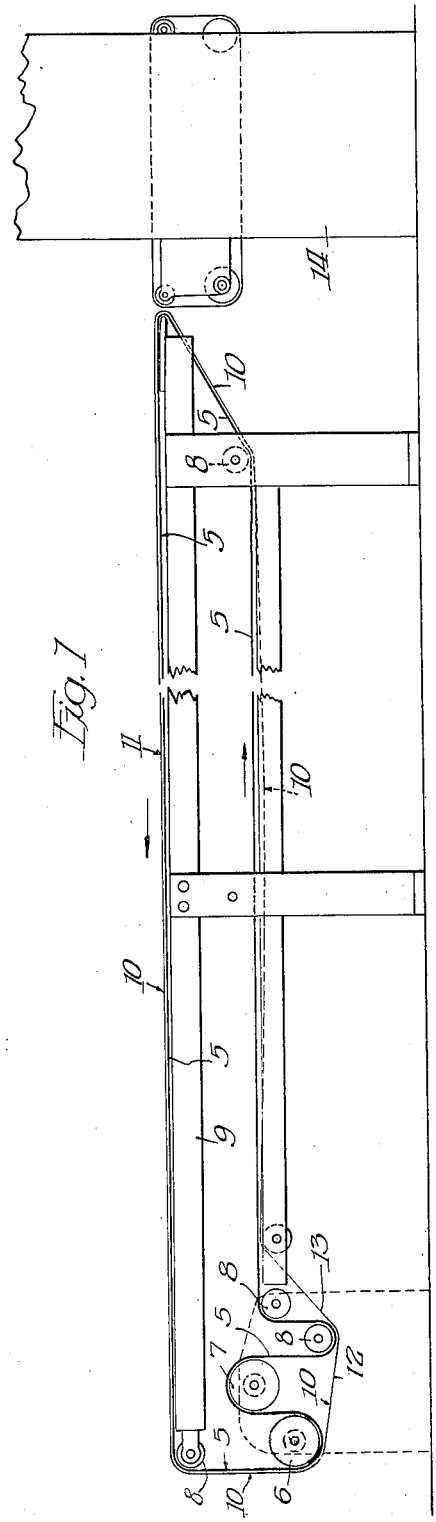
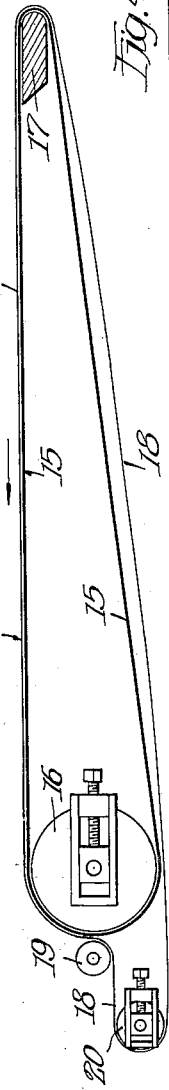
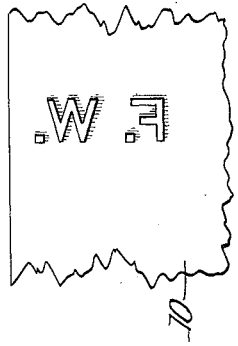
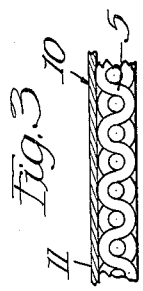
Inventor:
Frederick Westerman,
By Fisher, Towle, Clapp & Evans
Attys.

Patented May 20, 1924.

1,494,655

UNITED STATES PATENT OFFICE.

FREDERICK WESTERMAN, OF CHICAGO, ILLINOIS.

CONVEYER.

Application filed February 12, 1923. Serial No. 618,433.

*To all whom it may concern:*

Be it known that I, FREDERICK WESTERMAN, a citizen of the United States, residing in Chicago, in the county of Cook and State of Illinois, have invented certain new and useful Improvements in Conveyers, of which the following is a specification.

This invention relates to apparatus for the making of pastry, confections and the like but more particularly to endless conveyers or aprons for transporting these articles and has for its primary object to provide an improved type of conveyer or apron.

In the manufacture of pastry, confections and the like the articles are generally conveyed upon an endless belt of canvas running over a series of pulleys and idlers. Sheets of prepared paper are generally placed upon this belt and the articles rest upon these sheets. This protects the belt and facilitates the removal of the articles. The sheets are removed from the conveyer at the discharge end of the apparatus. Frequently clips are used to retain the sheets in place upon the belt. The use of paper in this manner requires considerable manual labor and is very unsatisfactory.

To obviate the disadvantages of the use of paper in the manner set forth, I have provided an endless apron of prepared paper or other suitable material which envelops the conveying belt and performs the function of separate sheets. The loaded portion of this enveloping apron preferably rests directly upon the conveying belt so that the material of the apron is subjected to very little tensile strain. A new apron may be quickly and easily applied whenever required. This apron may be embossed to mark the cakes or confections.

Referring to the drawing, Fig. 1 is a side elevation of a portion of an icing machine having my invention incorporated therein.

Fig. 2 is a side elevation of a well-known type of conveyer having my improved apron applied thereto.

Fig. 3 is an enlarged detail sectional view of the conveyer belt and apron, and

Fig. 4 is an enlarged detail plan view of a portion of the apron.

In Fig. 1 of the drawing a conveyer belt 5 of canvas or other suitable material operates over the usual pulleys 6 and 7 and idlers 8 mounted in a supporting frame 9. An endless apron 10 of paper or other material suitable for the purpose envelops this conveyer belt. The upper or load carrying portion 11 of the apron rests upon the corresponding portion of the belt and is completely supported thereby, as is illustrated in Fig. 3. The frictional engagement of the contacting surfaces of the belt and apron causes the apron to be driven by the belt. It is unnecessary and often inadvisable that the apron follow the complete path of the belt as the frequent bending of the apron decreases its life. The elimination of turns in the apron is illustrated at the portions 12 and 13 thereof. In the apparatus illustrated in Fig. 1 the pastry or confection is deposited upon the conveyer from an enrober 14 of well-known construction.

The physical characteristics of my apron present very different conditions from those existing in ordinary protecting belts. The material is of low tensile strength and therefore cannot be subjected to sufficient tension to enable it to be driven by pulleys in the usual manner. The driving action of the belt 5 is entirely independent of the tension of the apron and is distributed over substantially the entire area of contact with the apron. The strain on any particular portion of the apron is therefore exceedingly small. This is true even when the apron is fully loaded. The thin, flexible character of the material of the apron causes it to cling to the upper layer of the driving belt.

Fig. 2 illustrates a different design of apparatus. A conveyer belt 15 similar to the one described in connection with Fig. 1 is driven by pulley 16 and passes about the block 17. An apron 18 envelops this belt and passes about idlers 19 and 20. The idler 20 is adjustable to regulate the tension of the apron. The upper or load carrying portion 21 of the apron 18 is completely supported by the belt in the manner previously described.

Fig. 4 illustrates the embossing of the apron to mark the pastry or confection resting thereon.

I claim as my invention:

1. A conveyer for pastry and confection machines, comprising a positively driven endless conveyer belt and an endless band of thin prepared material extending entirely around the belt throughout the length thereof and traveling with the belt under the sole action of frictional contact with the load carrying portion thereof.

2. In a pastry and confection machine, the combination with an enrober and a positively driven endless conveyer belt cooperating with and leading from the enrober, of an endless band of thin prepared material loosely enveloping the conveyer belt in frictional contact with the load supporting portion thereof and traveling with the belt under the sole action of the frictional contact therewith.

3. A pastry and confection machine including a conveyer made up of driving rolls, an endless conveyer belt traveling about the rolls in frictional driving contact therewith, and an endless band of thin prepared material extending loosely around the conveyer belt and in frictional contact with the load carrying portion thereof, the band being driven solely by its frictional contact with the load carrying portion of the conveyer belt.

FREDERICK WESTERMAN.